US005394605A

United States Patent [19]

Fattori et al.

[11] Patent Number: 5,394,605

[45] Date of Patent: Mar. 7, 1995

[54] COMPOUND CURVE SHAPING APPARATUS AND METHOD, AND PRODUCT PRODUCED

[75] Inventors: Joseph E. Fattori, Mendham; David J. Schiller, Blairstown, both of N.J.

[73] Assignee: The Mennen Company, Morristown, N.J.

[21] Appl. No.: 705,530

[22] Filed: May 24, 1991

[51] Int. Cl.[6] .................. B29C 59/00

[52] U.S. Cl. .................. 29/563; 83/56; 83/267; 29/558; 264/162; 425/307; 425/DIG. 32; 409/132; 409/293; 409/303; 409/308

[58] Field of Search .................. 425/304, 302.1, 299, 425/301, 306, 307, DIG. 32; 83/13, 56, 267; 264/162, 158; 407/54; 29/558, 563; 409/292, 293, 303, 315, 316, 319, 131, 132

[56] References Cited

U.S. PATENT DOCUMENTS

| | | | |
|---|---|---|---|
| 1,894,863 | 1/1933 | Gubing | 425/DIG. 32 |
| 1,983,770 | 12/1934 | Pagendarm | 409/293 |
| 2,590,042 | 3/1952 | Root | 409/289 |
| 2,741,164 | 4/1956 | Smedley | 409/293 |
| 3,559,256 | 2/1971 | Lemelson | 29/33 P |
| 4,243,348 | 1/1981 | Paige | 407/54 X |
| 4,700,488 | 10/1987 | Parker | 264/274 X |
| 4,841,826 | 6/1989 | Smith, III | 409/293 X |
| 5,083,486 | 1/1992 | Allison et al. | 83/267 X |

FOREIGN PATENT DOCUMENTS 0335112 2/1989 European Pat. Off. .

*Primary Examiner*—Z. R. Bilinsky

*Attorney, Agent, or Firm*—Antonelli, Terry, Stout & Kraus

[57] ABSTRACT

Disclosed is a method and apparatus for shaping a top surface of a product, such as an antiperspirant or deodorant product, to have a compound-curved shape. The apparatus includes at least one cutting blade which moves inward and outward in a second direction while the product passes by in a first direction perpendicular to the second direction, such that the cutting blade cuts the top surface of the product to have a desired profile in the first direction. The cutting blade itself can have a desired profile along a third direction perpendicular to the first and second directions, to impart to the top surface of the product a desired profile in the third direction. A plurality of cutting blades can be used, to incrementally remove product material to form a final shaped product surface. The product cut off in forming the shaped surface can be reclaimed for re-use. The apparatus can also include stationary blades, and can be used to form a product having a shaped top surface with a profile having different radii of curvature in the same direction.

46 Claims, 9 Drawing Sheets

COMPOUND CURVE SHAPING APPARATUS AND METHOD, AND PRODUCT PRODUCED

BACKGROUND OF THE INVENTION

The present invention relates to apparatus for shaping exposed surfaces of a product (for example, for shaping the exposed top surface of a stick product, such as an antiperspirant/deodorant stick product), methods of shaping such surfaces of such products, and the products produced. More particularly, the present invention is directed to an apparatus and method for shaping the exposed top end of an oval cross-section stick product (e.g., an elongated (elliptical) antiperspirant/deodorant stick product) so as to have a compound curve shape, contoured in two separate directions (e.g., a domed shape).

It is desirable to produce stick products, such as (but not limited to) antiperspirant/deodorant or other cosmetic and toiletry products, having a top surface (to contact selected parts of a human body) in a form or shape adapted to comfortably apply the product to selected parts of the human body. For example, it is desirable to produce antiperspirant/deodorant products having a top surface with a shape to substantially conform to the axillary region.

Solid forms of antiperspirant or deodorant products are generally produced by molding a liquid composition into a solid stick form having a variety of cross-sections (e.g., casting the liquid composition into a dispenser shell which is the barrel of the product package); in the presently popular elongated stick deodorant, the solid stick form has an oval or elliptical cross-section. The stick is molded within the dispenser shell which defines the cross-section of the product, with some mechanism being provided for advancing the stick from the shell so as to expose the top end of the stick, and for retracting the stickafter use.

The dispenser shells may be filled using either a top-fill or a bottom-fill method. In the top-fill method, the product container shell is entirely assembled except for the cap, and liquid product is poured into the container from the top and hardens or cures into the supporting platform which is already inserted in the bottom of the dispenser shell.

A problem with stick products as molded in this manner is that, as molded, the end of the molded product, e.g., to contact the body during application of a deodorant, does not have a desired shape. With a stick product made utilizing the above-referred-to top-fill method, producing a desired shaped end (to contact the body during application) requires trimming or cutting the end of the solidified product into the desired shape. With cylindrical antiperspirant sticks having a circular cross-section, the exposed end may be trimmed using, for example, an arrangement of hemispherically shaped cutting edges revolving about the cylindrical axis. However, it is more difficult to easily shape the end of a top-filled product if the cross-section of the solid stick form is oval, elliptical or anything other than circular.

European Patent Application No. 335,112 (hereinafter "EPA 335,112"), the contents of which are incorporated herein by reference in their entirety, discloses a method and apparatus for trimming into a desired shape the end of a solid cylindrical form, which can be utilized where the cross-section of the solid stick form is oval, elliptical or any other form, including circular. Specifically, in the disclosed process and apparatus the packaged products having exposed end portions desired to be shaped are provided at a product working station, each product working station having a shaping device. Each shaping device comprises at least a pre-cut member and a finish cut member (in one embodiment, the shaping device includes a pre-cut member and two finish cut members). Initially, the pre-cut member is rotated in a first direction about an axis through an arc sufficient to cause the pre-cut member to cut through one edge of a respective product to be shaped at a respective work station. Thereafter, the finish cut member (or members) is rotated (through an arc) in the opposite direction to that in which the pre-cut member was rotated, to province an exposed end of the product having the desired final shape. Each of the pre-cut and finish cut members have blades with a pre-determined profile in a direction perpendicular to the arcuate path, to contour the product in the direction perpendicular to the arcuate path. The excess material trimmed from the end of the product falls into a reclaiming tray for re-use or discard. During the cutting of the product to shape the end, the individual packaged products are held stationary; thereafter, the individual products are removed from the work stations, and replaced by new packaged products to be cut to have a desired end shape. Thus, in EPA 335,112 the producers whose surfaces are to be shaped are held stationary during shaping, the packaged products being treated in a batch process.

Various problems arise in connection with the method and apparatus disclosed in EPA 335,112. For example, since the European patent application discloses a batch process, the apparatus and method described therein are not conducive to performing and providing continuous treatment of stick product, e.g., on a continuous conveyancing system. Furthermore, since the cutting members disclosed in the European patent application have a single arcuate path, the apparatus and method in the European patent application cannot be utilized to provide different shapes for the exposed end of the product, e.g., in the direction of the plane containing the arcuate path; and, moreover, cannot be used to achieve a shaped end having different radii of curvature in a single direction (e.g., having different radii of curvature at the leading and trailing edges of an elliptical stick product, in the direction of the major axis of the ellipse, as compared with the radius of curvature at a central portion of such elliptical product in the direction of the major axis). Moreover, the structure and method in EPA 335,112 is relatively complex, requiring movement of a plurality of cutting blades in opposite arcuate directions.

Accordingly, it is desired to provide a method and apparatus for shaping the top surface of a packaged product (for example, a stick product, such as an antiperspirant or deodorant stick product) with a compound shape, using a simple technique, and which facilitates a continuous process.

In the following description, the present invention will be described in terms of shaping an antiperspirant or deodorant stick product for application to axillary regions of the human body. However, the present invention is not so limited, and, as can be appreciated, the present invention can be applied to other solid products (solid articles of manufacture), including other stick products for application to the human body (,e.g., insecticide sticks); or, more generally, to any solid article of manufacture wherein an exposed end thereof is to be shaped.

SUMMARY OF THE INVENTION

Accordingly, it is an object of the present invention to provide an apparatus and method for shaping the top surfaces of a solid product (e.g., a packaged product such as an antiperspirant or deodorant stick for application to axillary regions of the human body) with a predetermined shape in a first direction (e.g., a direction of movement of the product); it is also an object of the present invention to provide a solid product having such shaped top surface.

It is a further object of the present invention to provide an apparatus and method to shape the top surface of a solid product (e.g., a stick product such as an antiperspirant/deodorant stick product) with a compound shape both in a direction of movement of the product and in a direction perpendicular thereto, in a continuous technique which can be performed simply it is also a further object of the present invention to provide a solid product having such shaped top surface.

It is a still further object of the present invention to provide a method and apparatus for shaping an exposed end of a solid product, and to provide a shaped article produced by such method and apparatus, wherein the exposed end can be shaped to have a plurality of different radii of curvature in the direction in which the solid product is transported, and can also be shaped in a direction perpendicular to the direction of travel of the solid product.

It is a still further object of the present invention to provide a method and apparatus for shaping an exposed surface of a product with a compound shape, wherein breakage of the solid product during shaping, as well as undesired breaking of edges of the solid product during shaping, is avoided.

It is a still further object of the present invention to provide a method, and apparatus, for shaping the top surface of a solid product (e.g., a stick product, such as an antiperspirant/deodorant stick product), wherein product removed during the shaping can be re-claimed (e.g., for re-use).

The foregoing objectives are achieved according to the present invention, wherein the solid packaged product moves relative to a cutting station (that is, the location where the shaping takes place).while cutting product material from the top surface of the packaged product, to shape the top surface; with a cutting blade, which shapes the top surface and is provided at the cutting station (which cutting blade can have a curved profile), moving relative to the packaged product, e.g., toward the packaged product at the cutting station (e.g., in a direction substantially perpendicular to the top surface of the product as the product moves relative to the cutting station) while performing the cutting to shape the top surface.

Desirably, the cutting blade performs reciprocal movement relative to the packaged product during cutting, both inward and outward relative to the packaged product. By reciprocal movement of the cutting blade relative to the product, in a direction substantially perpendicular to the direction movement of the packaged product, while the packaged product is moving relative to the cutting station (and cutting blade), a top surface of the product can be shaped in a direction of movement of the product (e.g., with a dome-like shape). Moreover, by moving the cutting blades with a harmonic mention, while the product linearly moves through a cutting station, cutting blades extending toward opposite sides of a central (linear) conveyor can be used to shape product extending from the opposed sides of the central (linear) conveyor.

Furthermore, by using a blade with a curved profile perpendicular to the direction of movement of the product, the top end of the product will be shaped in a direction perpendicular to this direction of movement of the product. Thus, according to the present invention the top end of the product can be simultaneously-shaped in two directions (that is, simultaneously shaped with a compound curved shape).

By "cutting station" referred to herein, we mean the location where the cutting blade (e.g., movable cutting blade) is located for movement, e.g., perpendicular to the direction of movement of the packaged product. For simplification of the apparatus, preferably the packaged product moves while the top surface (top end) of the product is being cut, with the cutting station being stationary (e.g., the cutting blade not moving in the direction of movement of the packaged product), and the cutting blade at the cutting station moving substantially perpendicularly to the direction of movement of the packaged product through the cutting station. Alternatively, the cutting station and cutting blade therein can be stationary, and the packaged product moved through the cutting station with a component of movement through the cutting station, and a component of movement toward (or toward and away from) the cutting blade, to provide the movement of the packaged product relative to the cutting blade.

In addition, utilizing a movable (reciprocating) blade as discussed in the foregoing, at a cutting station, and (1) passing a packaged product through a plurality of such cutting stations each having a movable blade or (2) passing a product through a single cutting location a plurality of times, with small incremental amounts of product being shaved off the top during each pass through a cutting station, breakage of the product (due to cutting off too much product from the top in a single step) can be avoided, to successfully shape the top of the product without breakage.

Furthermore, according to the present invention, the top surface of the product can be provided with a plurality of different radii of curvature, e.g., in the direction of movement of the packaged product relative to the cutting station, so as to provide the most desirable shape for the top.

In addition, according to the present process and apparatus, wherein the packaged product is conveyed through each cutting station and shaped during relative movement between the cutting station and the product, a continuous process can be achieved.

In addition, the foregoing objectives are further achieved by collecting product material cut off during the shaping, and re-cycling the removed product for re-use. Such re-use of the product material avoids wastage of the product material, thereby decreasing costs of manufacture.

The foregoing objects are also further achieved by utilizing a movable cutting blade having multiple cutting surfaces, as the cutting blade at each cutting station, with movement (e.g., rotation) of each cutting blade between shaping of successive packaged product to present different cutting surfaces to successive packaged product; and by providing a cleaning member adjacent the cutting blade, at a location spaced from the cutting surface which is doing the cutting, to wipe off the cutting surface as it is moved (rotated). By providing such movement of the cutting blade and such cleaning member, a clean surface having no product build-up on it can be utilized for the cutting, so as to reclaim removed product material on cutting blade surfaces and prevent transfer of removed material from one cutting surface to a subsequent product. Such cleaning of the blade also provides a better cutting surface for cutting top surfaces of subsequent products and decreases the frequency of blade replacement, thus decreasing "downtime" of the apparatus and process in manufacturing shaped products.

Accordingly, by the present invention, the top surface of the product can be simultaneously shaped both in a direction of movement of the product relative to the cutting station and in a direction perpendicular to such movement (e.g., where the packaged product has an elliptical cross-section and the packaged product moves in a direction along the major axis, the product can be shaped simultaneously in directions of both the major and minor axes of the product), in a process which can be continuous, with little or no wastage of product and reduced downtime due to changing of blades, and with substantially reduced breakage of product during shaping.

DETAILED DESCRIPTION OF THE INVENTION

Figure 1:
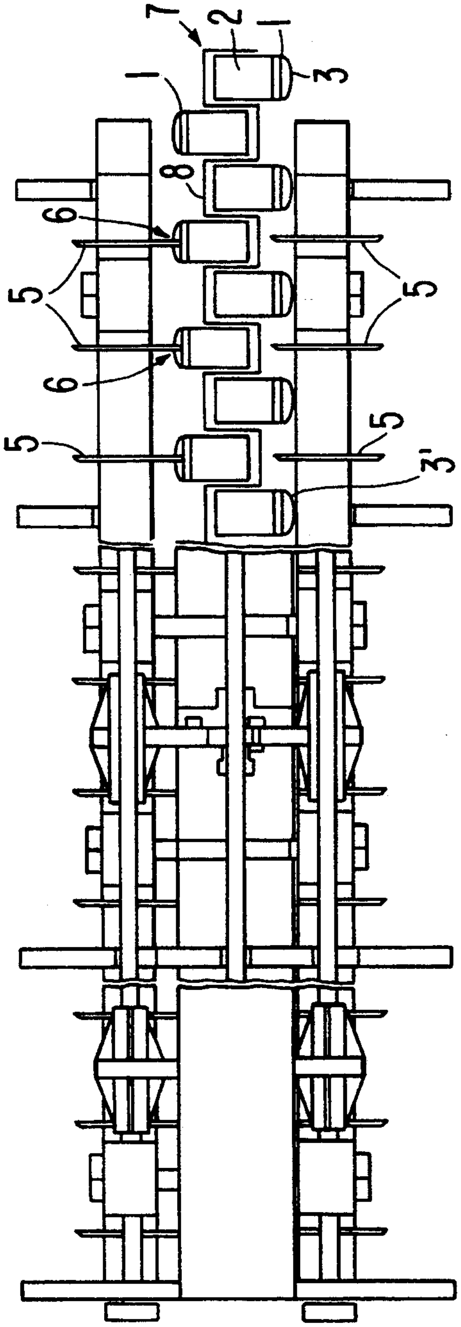
FIG. 1 is a top plan view of a first embodiment of the present invention.

While the present invention will be described in connection with specific and preferred embodiments, it will be understood that it is not intended to limit the invention to those embodiments. To the contrary, it is intended to cover all alterations, modifications and equivalents as may be included within the spirit and scope of the invention as defined by the appended claims.

The present invention contemplates a method, and apparatus, for shaping an exposed top surface of a solid product in, e.g., a package (e.g., in a dispenser shell), which can provide the top surface with a compound curved shape. According to the present invention, a cutting (shaping) blade is provided at a cutting station. The solid product in its package is conveyed through the cutting station while it is being cut by the cutting blade, which cutting blade also moves relative to the solid product in a direction toward (and or away from) the surface to be shaped (the cutting blade, e.g., moves in a direction away from and then toward the product) as the product passes through the cutting station. Moreover, desirably the product, in being provided with its final top shape, passes through either a plurality of cutting stations, or passes through a single cutting station a plurality of times, with small incremental amounts of product being shaved from the exposed top surface at each cutting station, to avoid removal of too much product at a single cutting which could possibly cause breakage of the product.

Alternatively, the packaged product can be positioned on a rotating holder, extending radially outwards, and conveyed past, e.g., a series of fixed blades, providing incremental removal of product, with a final movable cutting blade (having reciprocal movement toward and away from the top surface, and perpendicular thereto) providing the final shape. By positioning the product on a rotating holder, the top surface is given somewhat of a curved shape when passing the fired shaping blades; and can be given, e.g., a shape having at least two different radii of curvature in the transporting direction by being cut by the movable blade in a final step.

In order to more particularly describe an apparatus and method according to the present invention, the following description is broken down into two phases: the first phase describes shaping of a minor axis of the product (e.g., a packaged elongated stick product having an elliptical cross-section with major and minor axes), while the second phase describes shaping of the major axis. Although these two phases are described separately in the following, the apparatus shapes the product in the direction of the minor axis and in the direction of the major axis simultaneously.

First will be discussed the shaping of the minor axis, in a preferred embodiment. The apparatus employs multiple cutting blades which are generally circular. Each blade has multiple cutting surfaces, each of which is profiled with the desired curvature to be formed on the product along the minor axis. Each blade is different from the other blades in that the centerline of the desired curvature (e.g., the center of the radius of curvature) of the cutting surfaces thereon is moved outwardly (in a direction closer to the product) in incremental steps from blade to blade. All blades can have the same amplitude of movement. This allows for the incremental removal of product in shaping the exposed top surface of the product as the product passes a cutting surface of each blade. The multiple cutting surfaces of each cutting blade allow the blades to be rotated after a product has been cut so that as each new stick passes by a cutting surface, a clean edge is present. The blade is cleaned of product by employing a rubber squeegee to wipe product from the blade as the blade is rotated in an area approximately 180° from where a cutting surface of the blade shapes the product. The blades are positioned adjacent to one another along a central axis, with a spacing between blades of at least the width of the product being shaped (that is, at least the width of the product in its package, e.g., an antiperspirant-/deodorant stick product in its dispenser shell package). The product moves linearly along a conveyor parallel to the central axis of the blade such that the products hit the cutting surfaces perpendicularly.

The shaping of the major axis is accomplished by moving the cutting blades of the minor axis inwardly and outwardly as the stick product is passing by the cutting surface. In order to generate a curved surface along the major axis by moving the cutting blade in and out, a rotary cam track and follower can be employed, in a preferred embodiment. The design of the cam track is developed and based on the curvature of the product desired along the major axis and is related to linear product movement. Since the rotary cam track is used to generate a reciprocating movement of the cutting blade inward and outward, harmonic motion is employed by inverting the curve through one revolution of the cam wheel. This prevents vibration of the apparatus and also enables opposite ends of sequential products to be shaped.

Figure 15A:
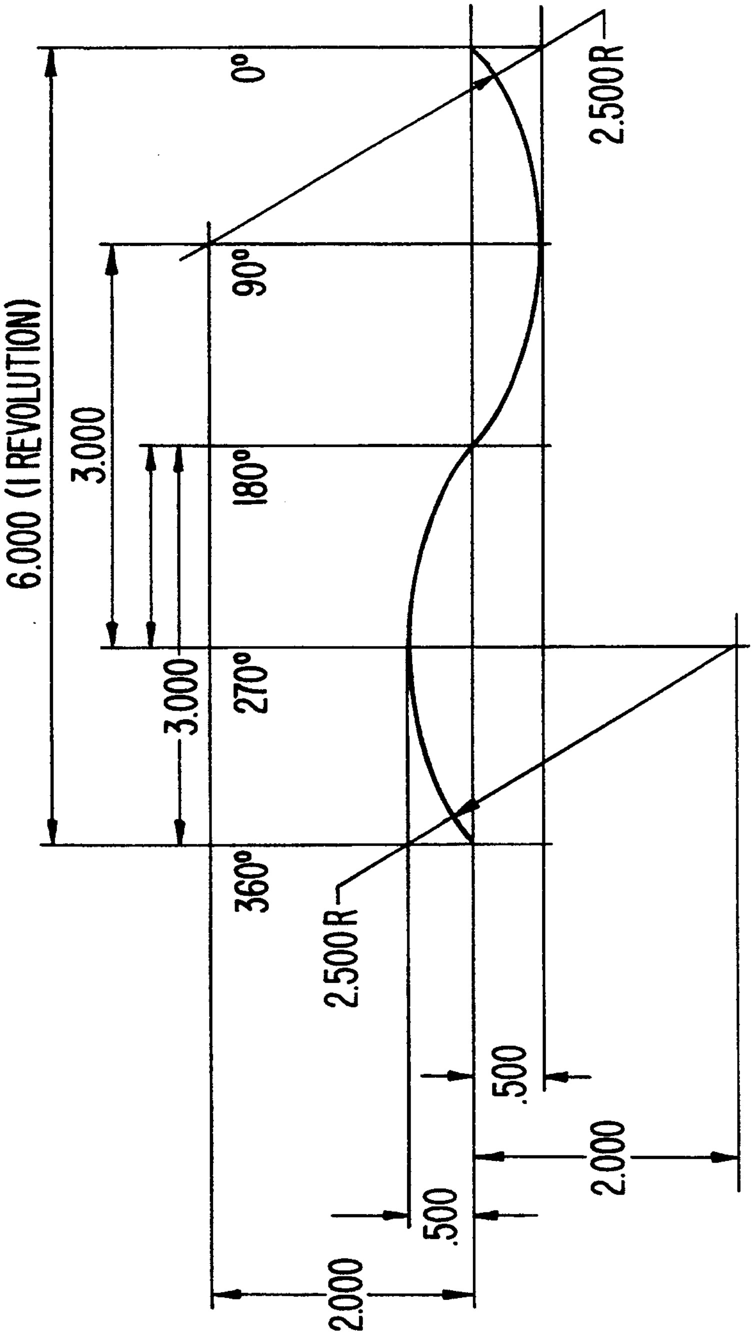
FIGS. 15*a* and 15*b* are graphs for explaining how to design the rotary cam track.

Design of the rotary cam track can easily be made, as seen in the following. Referring to FIG. 15*a*, it can be seen that a 2.500 radius has been chosen as the desired curvature along the major axis for this particular sized product, and that the curvature takes place within 3.000 inches of linear travel. Inverting the curve then completes the sine wave for a total linear travel of 6.000 inches. Plotting "x" and "y" coordinates of points along the curve is the next step in the development of the cam track.

Figure 15B:
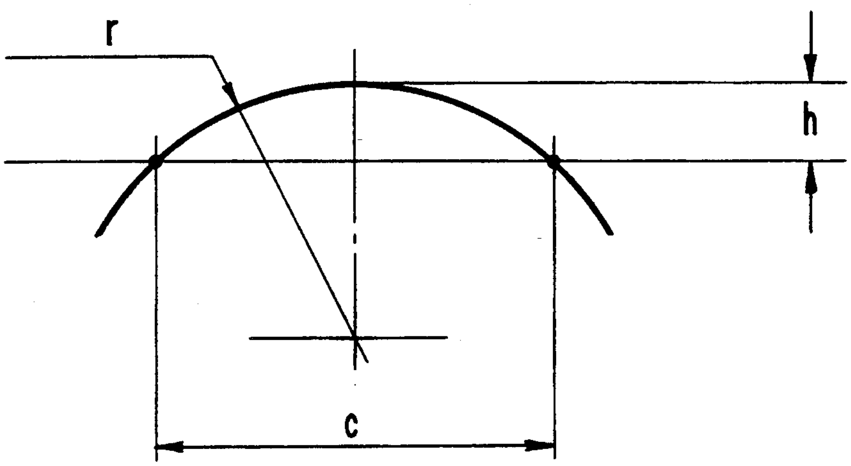

The formula (I), $h=r-\frac{1}{2}\sqrt{4r^2-C^2}$, is used to plot these points. See FIG. 15*b* covering what is represented by "r", "h" and "C". Note that "r" represents the desired radius of curvature of the product; "C" represents a position during linear travel of the product; and "h" represents a differential between (a) the distance from the hub of the cam wheel to, the closest position of the cam track thereto, and (b) the distance between the hub of the cam wheel and the center line of the cam track for the specific position "C".

As the value of "C" is incrementally reduced (linear travel) determining an "X" coordinate along the curve, the corresponding "Y" coordinate is calculated using the above formula. Once the "X" and "Y" coordinates have been determined for a number of points they can be placed along angular centerlines to total 360° of rotation. In the example shown in FIG. 15*a*, where an increment of "C"=0.125 inches which determines two points on the curve, half of which is one point or 0.0625 inches (increments) to achieve 96 increments within 360°. We then divide 360° by 96 increments to get 3.75°/increment. The 3.75° increments therefore become the "X" coordinates and the "Y" coordinates previously calculated are located along the coordinates measured from the center of rotation of the cam wheel.

Another method of moving the cutting blades inwardly and outwardly is to use a "stepping" or "servo" motor, known in the art, which can be programmed to move in different incremental steps to generate the curve, using the same basic formula set forth in the foregoing (as formula (I)).

Product removed during the shaping process falls into a container, where it can be recycled for further use. Desirably, the cutting blades are heated, so as to improve efficiency and effectiveness of cutting while avoiding breakage of product; and so as to facilitate cleaning of the blades and removal of product into a container for re-cycling for further use.

The following specific embodiments, described in connection with the drawing figures, illustrate various aspects of the present invention. While illustrative, they do not limit the present invention, which is defined by the full scope of the appended claims and equivalents thereof.

EMBODIMENT 1

FIG. 1 shows a first embodiment of the present invention, for shaping the exposed top surface 3 of a packaged product 1 (e.g., an antiperspirant/deodorant stick product in a dispenser shell). As seen in FIG. 1, packaged product 1 having an exposed top surface 3 is held by product supporting puck 2 which forms part of a continuous conveyor 7. Two banks of cutting blades 5 are provided, respectively on each side of the conveyor 7. By providing the cutting blades with a reciprocating movement (harmonic motion), packaged product 1 extending from opposed sides of conveyor 7, as shown in FIG. 1 (the product extending to the opposed sides being alternated), can be shaped using cutting blades (on opposite sides of the conveyor) attached to a common support and a common means for causing movement (a common support and common driving means for each set of two blades, for example). The cutting blades are each provided at a cutting station 6, the location where the cutting is performed. The exposed top surfaces of the packaged product, in an alternating manner, extend toward the blades on one side of the conveyor belt 8 and on the other side of the conveyor belt 8.

Figure 2:
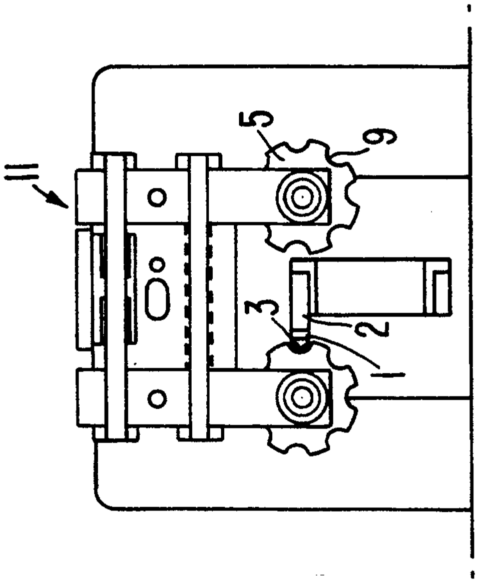
FIG. 2 is an end view showing a cutting blade shaping an exposed top surface of a product in a package (e.g., in a dispenser shell), and having structure for blade movement.

As seen in FIG. 1, the blades on the opposite sides of the conveyor belt 8 are in a same plane perpendicular to the direction the conveyor belt extends. Looking more specifically, to FIG. 2, the blades in a common plane on opposite sides of the conveyor belt are connected to a common support, and move together in reciprocating (harmonic) motion. Specifically, FIG. 2 shows support 11 for holding the blades in a common plane on both sides of the conveyor belt. Shown in FIG. 2 is a puck 2 holding packaged product 1, the packaged product having exposed top surface 3 to be shaped by cutting blade 5.

Also shown in FIG. 2 is a cutting blade 5 having multiple cutting surfaces 9; such blade is rotatable such that, for each succeeding packaged product 1 having exposed top surface 3 to be shaped, the blade 5 can be rotated to present a clean cutting surface 9 to the exposed top surface 3 to be shaped. As is clear from FIG. 2, the blades on opposed sides of the conveyor are fixed to each other but can be reciprocated toward and away from the conveyor belt, perpendicular to the belt, in order to provide shaping of, e.g., the major axis of the exposed top surface. Reference character 3' represents the shaped top surface of packaged product 1, after the packaged product has passed by a plurality of cutting blades 5, respectively, at cutting stations 6.

Figure 3:
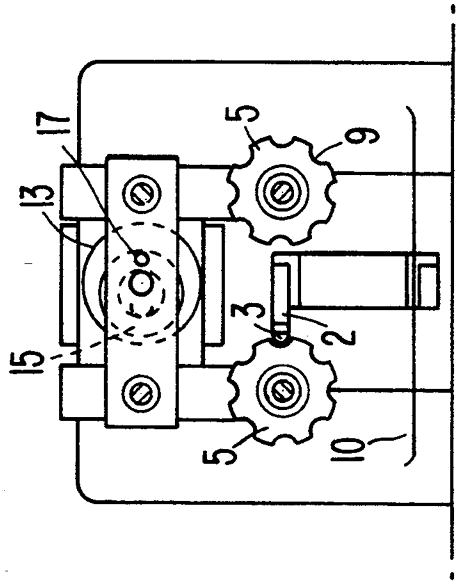
FIG. 3 is an end view showing a cutting blade shaping an exposed top surface of a product, showing the camming structure utilized for reciprocal movement of the blades.

FIG. 3 shows camming structure for providing reciprocal movement of the blades 5. Thus, provided is camming wheel 13, having camming track 15. Provided on the track 15, and fixedly attached to support structure 11, is cam follower 17. The cam follower 17 stays in track 15 during rotation of camming wheel 13, thereby causing reciprocating movement of structure 11 and the associated blades 5. It is important to understand that the reciprocating motion of the blade is timed to the linear motion of the product and that the cam track generates a curve relative to the linear travel of the product. FIG. 3 also shows a tray 10 for retaining product cut off in shaping the top surface of the product; this retained product can be re-cycled for re-use.

Figure 4:
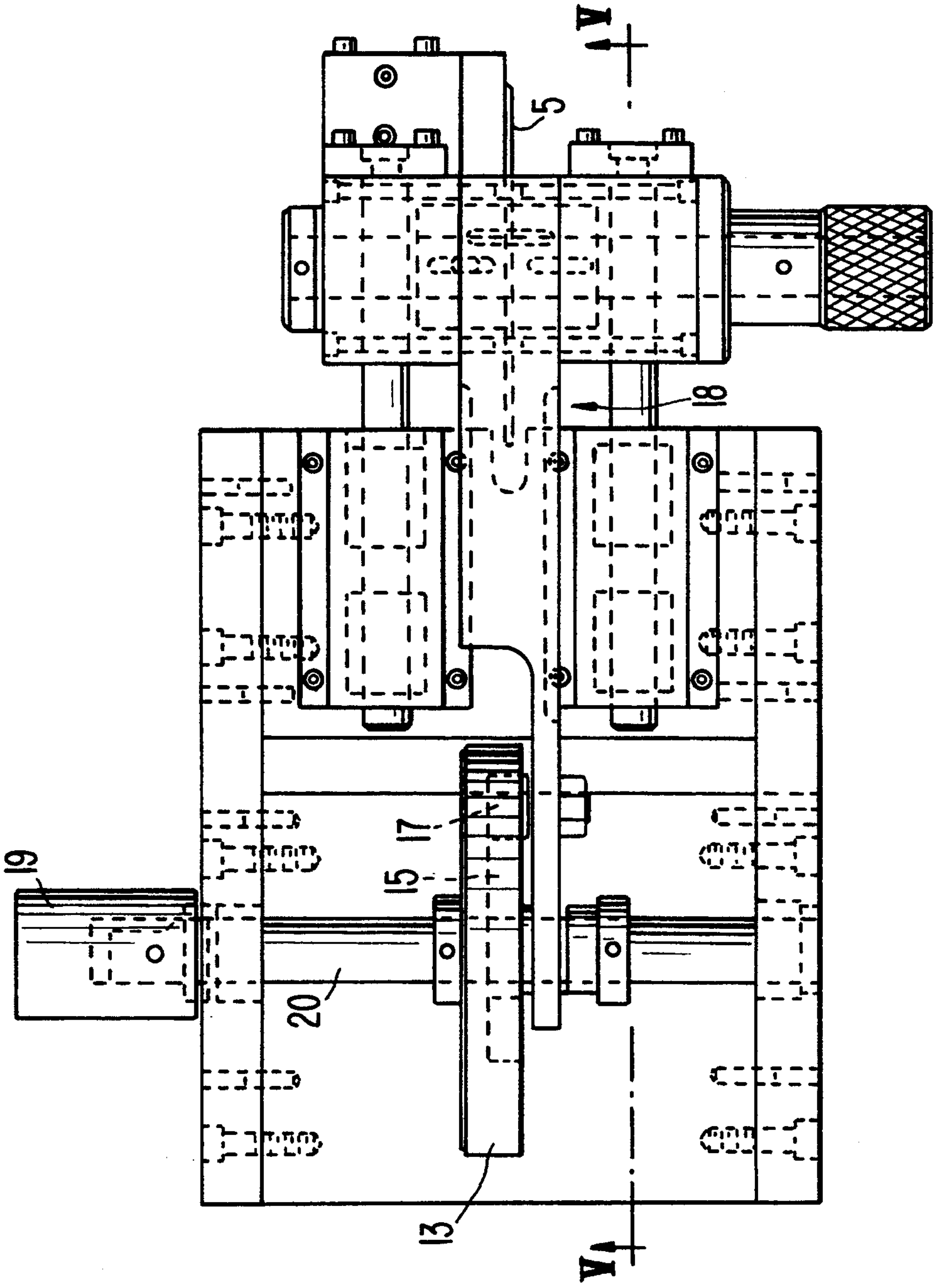
FIG. 4 shows structure for reciprocating movement of the cutting blade.

FIG. 4 provides a more detailed, top view of a structure used to reciprocatingly drive the cutting blade 5, to achieve shaping of, e.g., a major axis of the packaged product (that is, to shape the product in the direction of conveyance , of the packaged product). In FIG. 4, for purposes of simplification a blade structure is shown on one side of the camming structure. This could be used with a continuous belt conveyor as in the structure of FIG. 1, but having cutting blades (and the corresponding cutting stations) on only one side of the conveyor, and having the exposed top surfaces 3 of the packaged product 1 extending at only one side of the conveyor.

Shown in FIG. 4 is motor 19, for driving cam wheel 13. Such motor 19 is, desirably, operatively connected for driving the conveyor in addition to driving the cam wheel 13, such that the conveyor is driven cooperatively with the reciprocal movement of the cutting blade perpendicular to the direction of conveying of the packaged product. Cam follower 17 is provided in cam track 15 of the cam wheel 13, so as to cause reciprocal movement of the blade 5 through movement of blade support/holder 18.

Figure 5:
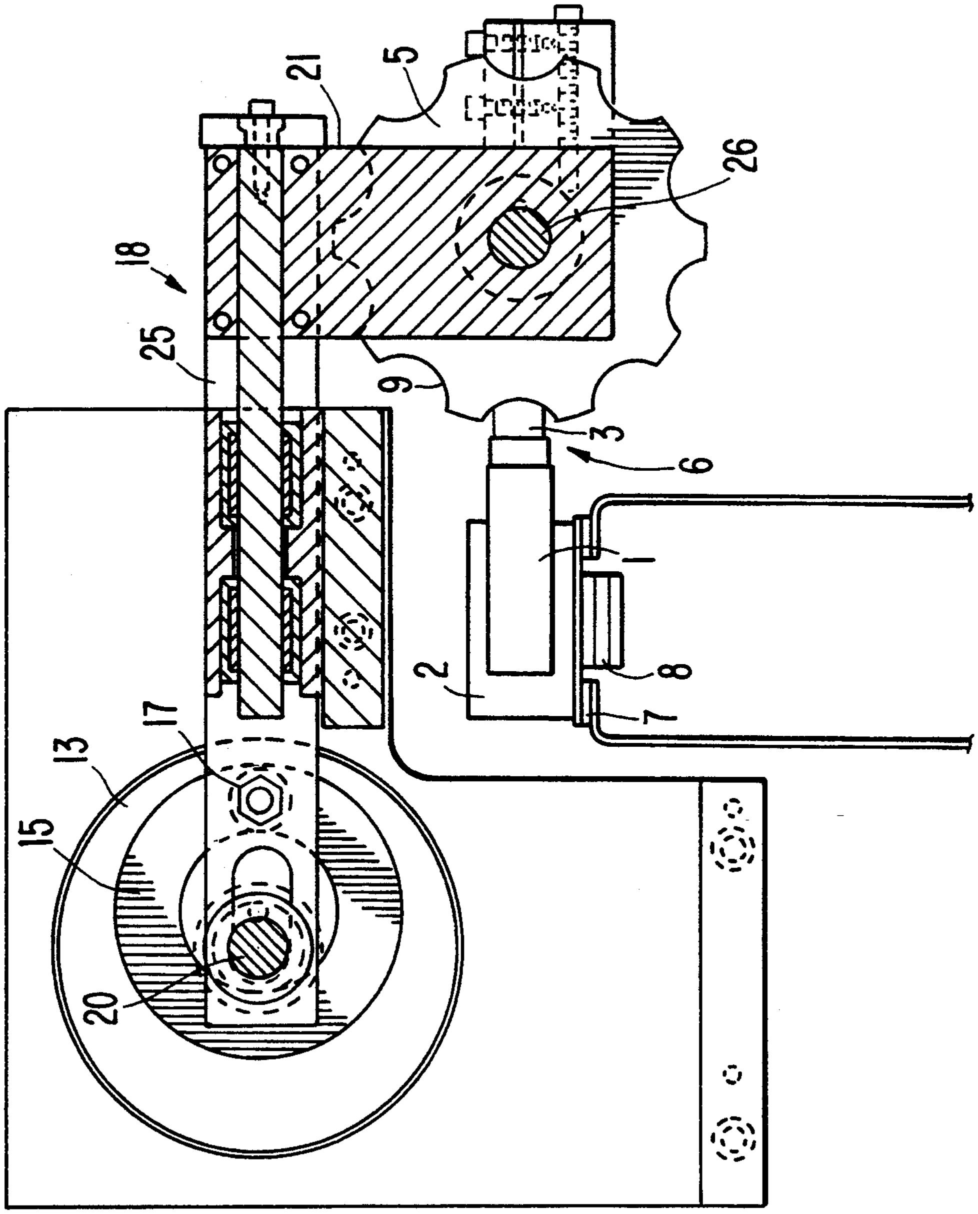
FIG. 5 is a view along line V—V of FIG. 4.

FIG. 5 shows a more detailed structure for reciprocating movement of the cutting blade 5. Shown in FIG. 5 is product supporting puck 2 supporting a packaged product 1, with exposed top surface 3 that is being shaped by one of the cutting surfaces 9 of cutting blade 5. Also shown in FIG. 5 is a belt 8 of conveyor 7 (discussed in connection with FIG. 1). The cutting blade 5 is supported by support arm 21, which is fixedly attached to reciprocating arm 25, of blade support/holder 18, to provide the reciprocal movement. Also shown in FIG. 5 is the cam wheel 13, in its relationship to the blade support/holder 18. Shown in FIG. 5 is the cam follower 17 provided in track 15 of cam wheel 13. The cam wheel 13 is fixed to axle 20, which is rotatably connected to motor 19 (note FIG. 4).

Through use of the operative connection of cam follower 17 in cam track 15 of cam wheel 13, and connection thereof to cutting blade 5 through the blade support/holder 18, the cutting blade 5 can be caused to reciprocate outwardly and inwardly during conveyance of the product through the cutting station containing the cutting blade, to cause contouring of the top surface of the product in the direction of linear movement of the packaged product.

Figure 6:
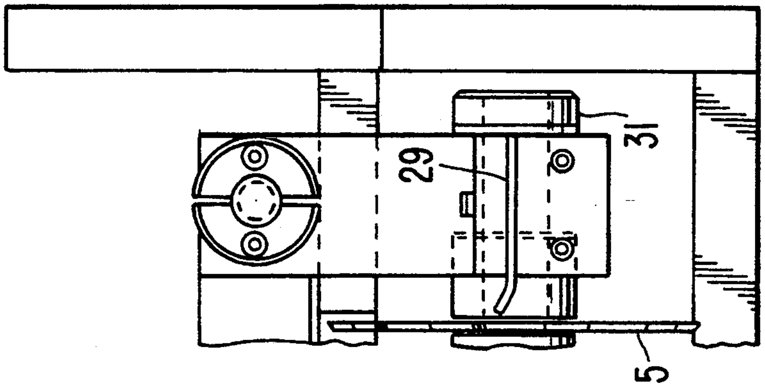
FIG. 6 is a view showing structure for rotating and cleaning the cutting blade.

FIG. 6 shows structure utilized for rotating and cleaning the cutting blade, during use of the cutting blade for shaping. Shown in FIG. 6 is cleaning element 29 (e.g., a rubber squeegee which is adapted to rub against the cutting surfaces); the cleaning element is located approximately 180° from the cutting blade surface which is cutting the product (e.g., at the right side of cutting blade 5 seen in FIG. 5). Also shown in FIG. 6 is a member (illustratively, a motor) 31 which acts to rotate the cutting blade 5, after a cutting surface 9 of the blade 5 has been utilized for shaping, e.g., a single product, so as to provide a clean surface for each new packaged product to be shaped. The motor can be an indexing motor known in the art, and rotation of the cutting blade can be coordinated with conveying of the packaged product on the conveyor 7. As can be appreciated from FIG. 6, upon rotating the cutting blade to present a different (clean) surface for the cutting, the, e.g., rubber squeegee 29 rubs a cutting blade surface 9 that has been used to shape the product, 180° away from the cutting surface presented to the product, so as to clean the cutting surface.

Figure 7:
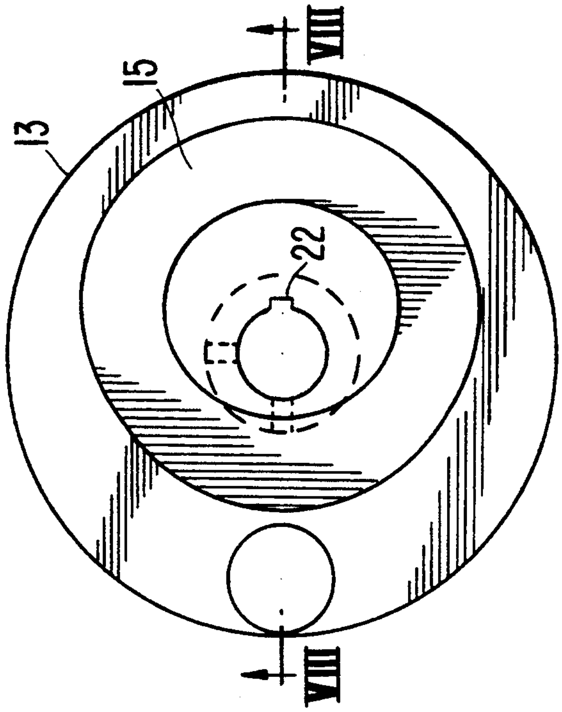
FIG. 7 is a more detailed view of a camming member which can be used in the first embodiment.
Figure 8:
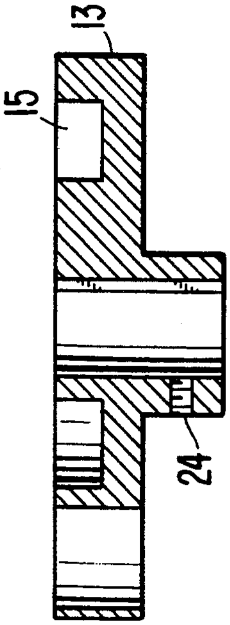
FIG. 8 is a view along line VIII—VIII of FIG. 7.

FIGS. 7 and 8 show, in greater detail, a cam wheel useful for this first embodiment of the present invention. To be noted in FIG. 7 is notch 22; a corresponding projection is provided on axle 20 driven by motor 19, in order to prevent slippage between the axle 20 and cam wheel 13. To further avoid any slippage, a set screw (not shown) can be provided in the threaded hole 24 (note FIG. 8) to lock against axle 20.

Figure 10:
FIG. 10 is a view along line X—X of FIG. 9.
Figure 9:
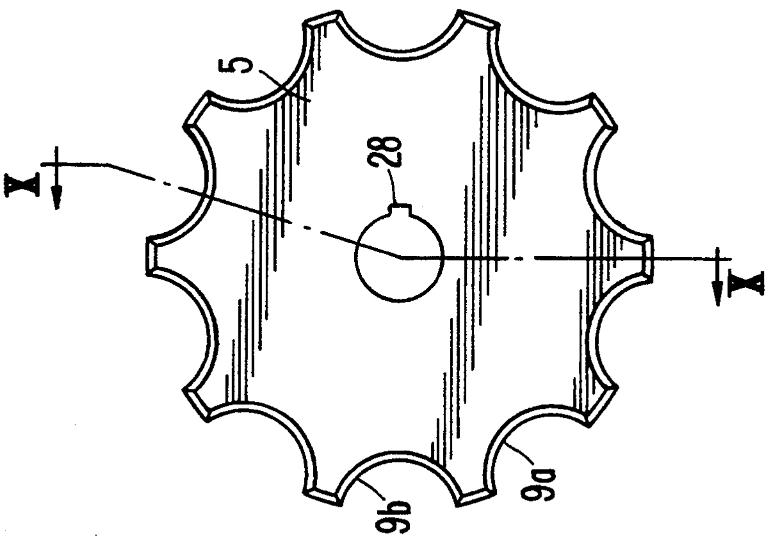
FIG. 9 is a more detailed view of a cutting blade useful in the first embodiment of the present invention.

FIG. 9 and 10 show, in greater detail, a cutting blade 5, having multiple cutting surfaces *9a*, *9b*, etc. The cutting blade 5 shown in FIG. 9 has multiple cutting surfaces *9a*, *9b*, etc. respectively with the same configuration (radius of curvature) but whose centerline of the curvature (center of the radius of curvature) differs for each cutting surface. This blade shown in FIG. 9 is primarily designed for a device wherein the product passes by a single blade multiple times. Between each pass, the blade is turned to present to the product a cutting surface whose centerline of curvature is closer to the product, so as to incrementally cut the exposed surface to shape the top surface of the product. Note that the cutting blade 5 has notch 28 corresponding to a projection in axle 26 (see FIG. 5) driven by motor 31, in order to prevent slippage between the axle and the cutting blade.

Operation of the first embodiment of the present invention will now be described. Product material is cast in, e.g., a stick package and the material hardened. Thereafter, the packaged product 1 is provided in a product supporting puck 2 on the conveyor 7 with its unshaped top surface 3 exposed so as to be shaped by the cutting blades. In the reciprocating movement of the cutting blades, a cutting blade is closest to the conveyor 7 when the blade is in a position equidistant between two products being shaped. When the blade first contacts the exposed top surface of the product, and as the product is moved, e.g., in a direction to the left in FIG. 1, the blade retracts away from the conveyor, until a position approximately in the middle of the product, where the blade is at its farthest position from the conveyor. The cutting blade then moves back toward the conveyor, thereby providing a convex top surface, in the direction of travel of the product. Illustratively, the cutting blade 5 moves reciprocating at a rate of 1 inch for every six inches of linear movement of a packaged product on the conveyor 7, in shaping the top surface of an elongated antiperspirant or deodorant stick product. The conveyor moves, illustratively, at a rate of 200 units per minute.

As seen in FIG. 1, a stick product passes through a plurality of cutting stations 6 (e.g., ten are shown in FIG. 1), with a cutting blade 5 at each cutting station. Incremental amounts of product are cut off the top surface by each blade, in order to provide the final shape to the top surface of the product (shown by top surface 31 in FIG. 1). Illustratively, a packaged product will pass through 8 or 10 cutting stations, each having a cutting blade as discussed in the foregoing, to incrementally shave the top surface of the product in forming the final shaped product.

Thereafter, the shaped product is removed from the product supporting puck 2 on the conveyor belt 8, and provided with a cap (e.g., after retracting the exposed shaped top surface) for further packaging.

As seen in FIG. 1, packaged product to be shaped can be staggered and alternately point to one side and the other side of the conveyor belt, respectively to be cut by cutting blades at one side or the other side of the conveyor. By the apparatus shown in FIG. 1, including alternate facings of the packaged product to be shaped, with cutting blades in a common plane at opposite sides of the conveyor operating together, the necessary apparatus can be simplified and throughput of packaged products for shaping can be increased. Moreover, packaged products can be continuously conveyed in providing the shaped final product, and any material cut off during shaping can be reclaimed.

EMBODIMENT 2

Figure 11:
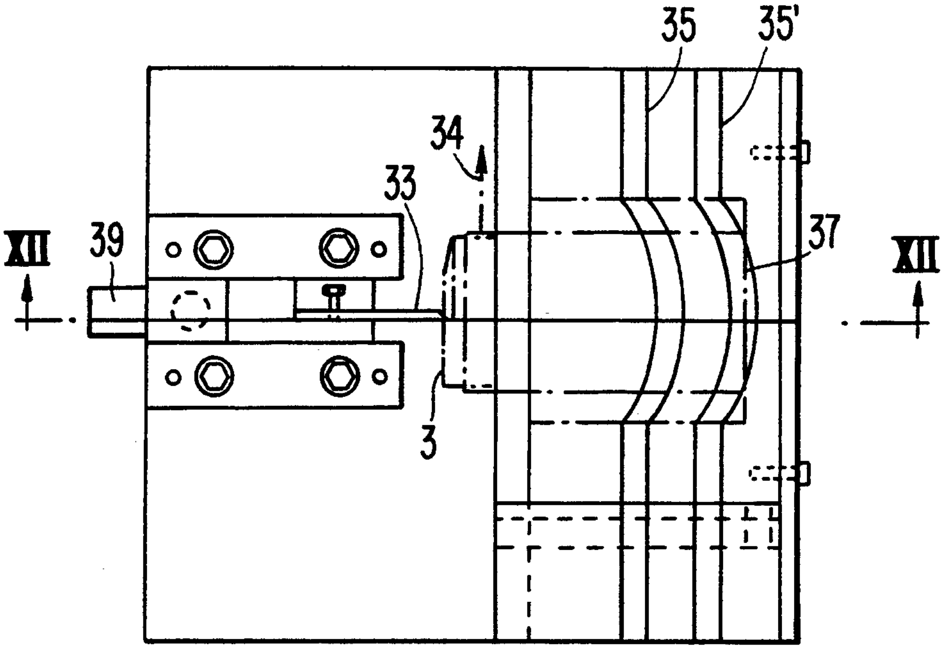
FIG. 11 shows a top plan view of a second embodiment according to the present invention.
Figure 12:
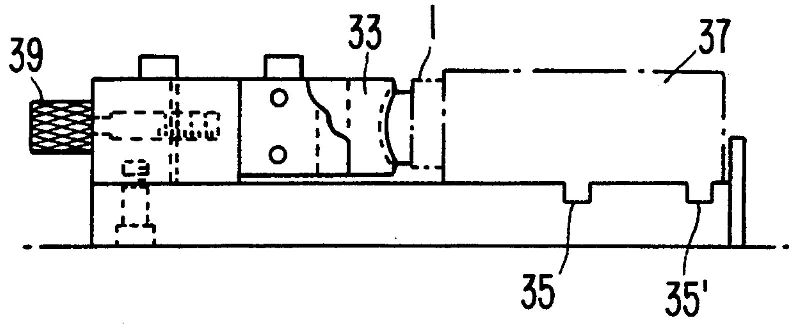
FIG. 12 is a view along line XII—XII of FIG. 11.

FIGS. 11 and 12 show a second embodiment according to the present invention, wherein the reciprocating relative motion of the cutting blade 5 inward and outward relative to the exposed top surface of the packaged product is caused by the product, in a holder, following a desired track pathway. Specifically, FIGS. 11 and 12 each show track 35, 35′ upon which packaged product supporting puck 37 travels. The packaged product supporting puck 37 supports, e.g., packaged product 1 having product with exposed top surface 3. The blade 33, in this embodiment, can be a stationary cutting blade having a contoured profile in a direction perpendicular to the direction of travel of the product, as seen in FIG. 12. Also shown in each of FIGS. 11 and 12 is adjustment screw 39, which can be used to position the fixed location of the blade 33 closer to the tracks so as to incrementally shave off the top surface of the product. While only a single cutting station with its corresponding cutting blade is shown in FIGS. 11 and 12, it can be appreciated by one of ordinary skill in the art that a plurality of such cutting stations, each respectively having its own cutting blade, can be utilized, to incrementally cut material from the top surface of the product in shaping the product to its final form.

In operation, an individual packaged product 1, with exposed top surface 3, is positioned in holder 37. Thereafter, the holder 37, provided in the tracks 35, 35′, moves in the direction of arrow 34 in FIG. 11. Following the track 33, 35′, during conveying of the holder the packaged product 1 is provided with a component of motion, relative to the cutting blade 33, initially away from and then toward the cutting blade 33, so as to achieve the desired radius of curvature of the shaped top surface of the product, in the direction of travel of the product. As seen in FIG. 12, the top of the product, in a direction perpendicular to the translational direction of the product, is shaped due to the profile of the blade.

According to this aspect of the present invention, complex structure for providing relative movement of the cutting blade toward and away from the top surface of the product, including camming structure, can be avoided.

EMBODIMENT 3

Figure 13:
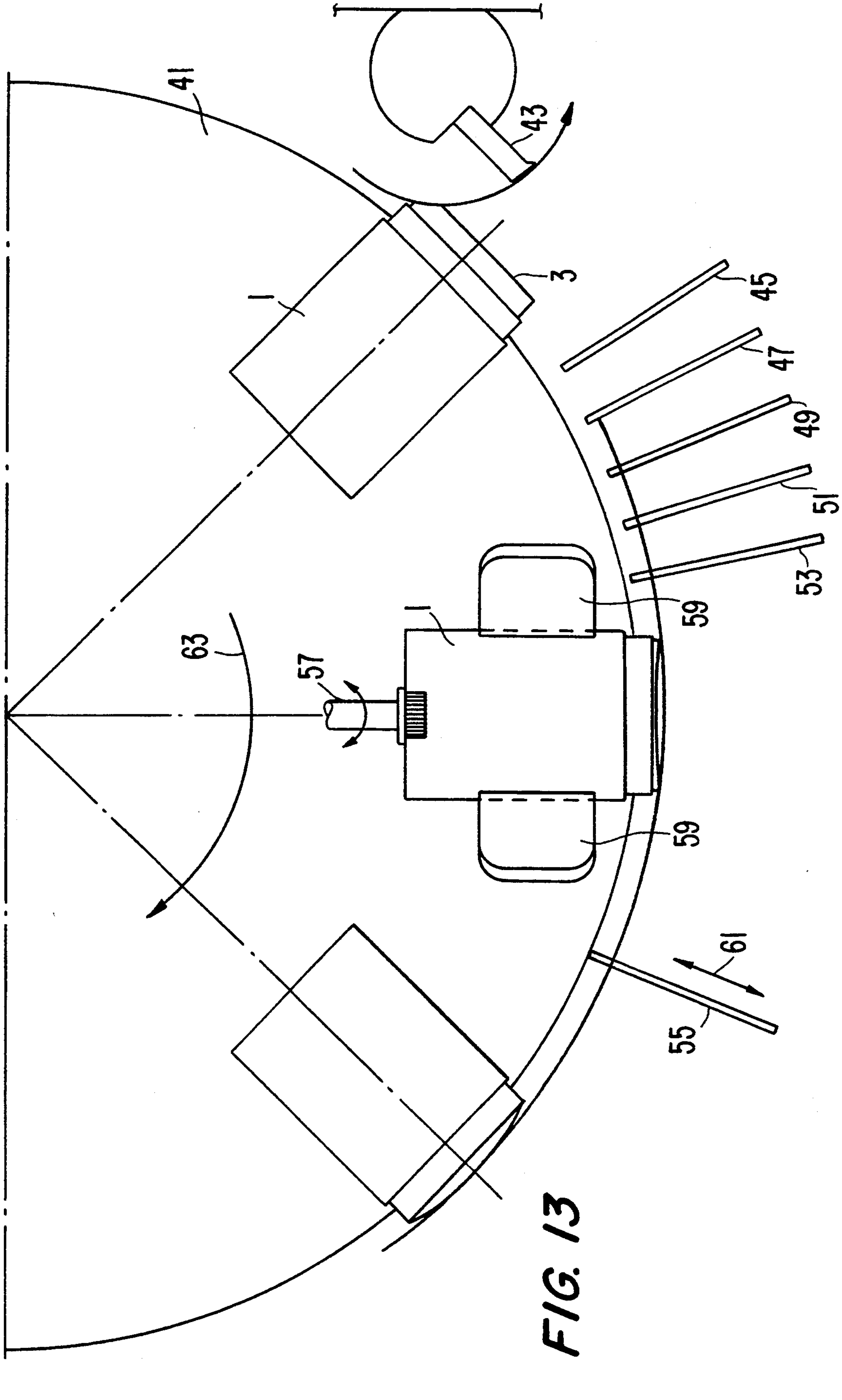
FIG. 13 shows a third embodiment of the present invention.

FIG. 13 shows a third embodiment of the present invention. This embodiment differs from the previous embodiments in utilizing a rotary indexing dial to support the packaged product during the shaping; in utilizing stationary cutting blades, in addition to using a moveable (reciprocating) blade; and in utilizing a trailing corner cut-off blade.

Specifically, shown schematically in FIG. 13 is a rotary indexing dial 41, for holding packaged product to be shaped. Illustratively (and not limiting), the rotary indexing dial, known in the art, is an eight-station rotary indexing dial having a 10-inch radius. The individual packaged product 1, each with an exposed top surface 3, are held by, e.g., spring-loaded pocket 59 on the rotary indexing dial 41. The apparatus, according to the present embodiment, includes trailing corner rotary cut-off blade 43; five stationary blades 45, 47, 49, 51 and 53; and movable final contouring blade 55. As can be seen in FIG. 13, the final contouring blade 55 moves in a reciprocating direction perpendicular to a tangent to the rotary indexing dial 41, such direction being shown by arrow 61. Also shown in FIG. 13 is a product elevating mechanism 57; this product elevating mechanism is utilized to expose a sufficient amount of the top surface 3 of the product, from the package, so as to effect shaping of the top surface by the various blades 43, 45, 47, 49, 51, 53 and 55.

While FIG. 13 does not show the specifics of the blades, the blades 45, 47, 49, 51, 53 and 55, in a plane perpendicular to the plane of FIG. 13, are contoured such that the final product is provided with a corresponding contoured shape in a plane perpendicular to the drawing figure.

Illustratively shown in FIG. 13 is an 8-station rotary indexing dial 41; the indexing dial shown is merely illustrative, and, as can be appreciated by one of ordinary skill in the art, an indexing dial holding a different number of individual products can be utilized.

As seen in FIG. 13, the stationary blades 45, 47, 49, 51 and 53 progressively get closer to the rotary indexing dial, in the direction of travel of the dial (shown by arrow 63 in FIG. 13), so as to incrementally cut off portions of the exposed top surface of the packaged product by the fixed blades. Since this aspect of the present invention uses a rotary indexing dial with the stationary blades, the stationary blades themselves provide somewhat of a curvature to the top surface of the product (e.g., antiperspirant or deodorant stick product). However, with only the stationary blades being used, the curvature provided is fixed dependent upon the radius of the rotary indexing dial, and stationary blades would not, by themselves, provide a desired curvature to the top surface of the product.

Accordingly, in this aspect of the present invention the movable (reciprocal) final contouring blade is utilized so that a desired curvature can be provided for the top surface of the product, in the direction of movement of the product. Furthermore, by use of the reciprocally operated final contouring blade, which moves perpendicularly to a tangent of the rotary indexing dial at the final contouring blade cutting station, the finished product can have different radii of curvature at different portions of the top surface, in a direction of travel of the product. That is, the final contouring blade can be reciprocated so that it only removes portions of the top surface at the front and trailing edges of the stick, leaving the remainder of the stick with a radius of curvature provided, for example, by the stationary blades.

The trailing corner rotary cut-off blade 43 is utilized to remove the trailing corner prior to passage of the packaged product past the stationary blades. Such trailing corner rotary cut-off blade is desirable in order to prevent breaking off of the trailing corner upon passage of the product by the stationary blades. Of course, movement of the trailing corner rotary cut-off blade, final contouring blade and rotary indexing dial can be coordinated to provide desired movement of the blades to perform the cutting.

In operation, initially the stick product is provided in spring-loaded pocket 59, at a loading station (not shown). Thereafter, product elevating mechanism 57 is operated so as to expose a top surface of the product, to be shaped. Thereafter, the rotary indexing dial rotates in clockwise direction shown by arrow 63, so as to pass the exposed top surface by the trailing corner rotary cut-off blade 43. The rotary cut-off blade acts to remove the trailing edge of the exposed top surface of the product. Thereafter, the rotary indexing dial is indexed in its rotation, to pass the exposed product past the 5 stationary blades 45, 47, 49, 51 and 53, so as to shape the top surface of the product by incrementally removing material forming the top surface. Thereafter, the product is passed through the cutting station having a cam-operated (movable) final contouring blade 55, so as to provide the product with its final shaped form. According to the embodiment shown in FIG. 13, only a single cam-operated contouring blade need be utilized.

Thereafter, the product, having a shaped top surface, can be retracted into the package, if desired, and capped for further processing.

Desirably, the trailing corner rotary cut-off blade, the stationary blades and the final contouring blade are heated (for example, heated by passing a liquid therethrough) so as to facilitate cutting by the blades. Moreover, the product removed during the cutting can be gathered in a, e.g., reclamation tray (not shown), for re-use.

Figure 14:
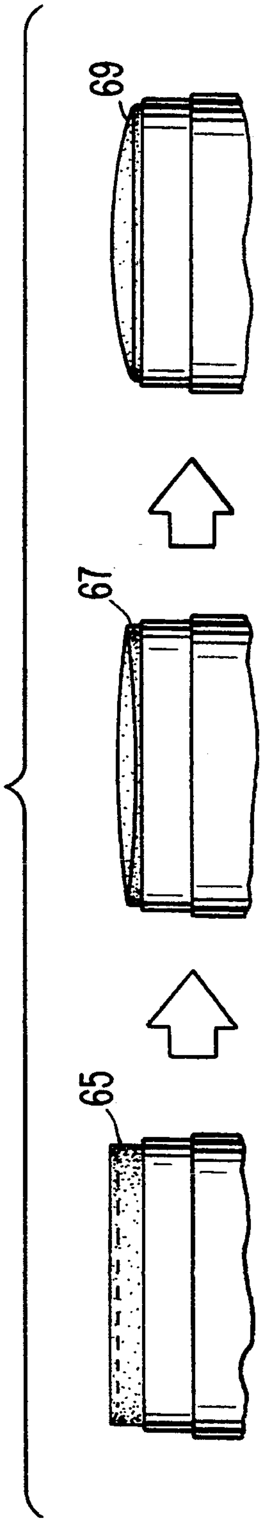
FIG. 14 shows the shaped top of a packaged pro,-duct, after being cut by fixed and movable blades described in connection with the third embodiment according to the present/invention.

FIG. 14 shows the contour of the top surface utilizing stationary blades initially and then a cam-operated final contouring blade, as discussed in the foregoing in connection with this third embodiment. Thus, in FIG. 14 reference character 65 indicates the top surface of the stick product after hardening of the cast product. As can be appreciated, due to surface attraction, the exposed top surface of the product has relatively sharp edges and a concave top. Reference character 67 shows the top surface after passing the packaged product, having an exposed top surface, past the stationary blades 45, 47, etc. As can be seen, a slight curvature is provided in the direction of movement of the product (that is, the length direction of the product, in the plane of the paper) 1 the top surface, after passing the stationary blades, is provided with a contour which corresponds to the contour of the stationary blades, in a plane perpendicular to the plane of the drawing figure. Reference character 69 shows the final product, wherein the cam-operated final contouring blade is utilized to provide a further contouring of the front and trailing edges of the stick product. As is clear from FIG. 14, the final contouring blade provides a different radius of curvature at the front and trailing edges of the product, in the direction of travel of the stick product (e.g., the elongated direction of the stick in an elongated (wide) stick deodorant/antiperspirant), as compared to the radius of curvature at a middle portion thereof.

Accordingly, by this aspect of the present invention, objectives discussed previously are achieved, and desired predetermined top surface profiles for the final product can be obtained. Furthermore, a relatively compact structure can be utilized, for shaping the top surface of the product.

While we have shown and described several embodiments in accordance with the present invention, it is understood that the same is not limited thereto, but is susceptible of numerous and modification as are known to one having ordinary skill in the art, and we therefore do not wish to be limited to the details shown and described herein, but intend to cover all such modifications as are encompassed by the scope of the appended claims.

What is claimed:

1. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station, wherein the driving member includes a conveying member for moving the product having the exposed surface through the at least one cutting station while the at least one cutting blade is cutting the exposed surface, whereby the product having the exposed surface is moving in the first direction while the cutting blade cuts the exposed surface; and structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is moving through the cutting station in the first direction; and wherein the at least one cutting blade has a predetermined profile in a third direction different from the first and second directions so as to give the exposed surface of the product a desired profile in a third direction, so that during the cutting at the at least one cutting station the exposed surface of the product is cut to simultaneously provide desired profiles in the first and third directions.

2. Apparatus according to claim 1, wherein said second direction is perpendicular to said first direction, and said third direction is perpendicular to the first and second directions.

3. Apparatus according to claim 1, wherein the conveying member is a continuous belt conveyor, having a plurality of product supporting members thereon, each product supporting member for holding an individual product.

4. Apparatus according to claim 3, having a plurality of cutting stations each with at least one cutting blade, and wherein the continuous belt conveyor is adapted to pass each individual product through the plurality of cutting stations, a cutting blade at each respective cutting station incrementally cutting material from the exposed surface in shaping the exposed surface.

5. Apparatus according to claim 4, wherein the plurality of cutting blades, respectively at the plurality of cutting stations, are positioned in spaced relationship along the continuous belt conveyor, and the structure for providing relative movement between the cutting blade and the product includes camming means for moving each cutting blade toward and away from the product, in said second direction, each cutting blade moving only in said second direction.

6. Apparatus according to claim 4, wherein the plurality of cutting blades, respectively at the plurality of cutting stations, differ from each other in that a downstream cutting blade, in the direction of movement of the product, has a centerline of curvature in the second direction that is closer to the continuous belt conveyor than that of an upstream cutting blade.

7. Apparatus according to claim 1, having a plurality of cutting stations each with at least one cutting blade, and wherein the structure for providing relative movement between the at least one cutting blade and the product includes, for each cutting blade, a cutting blade holder and driving means to reciprocatingly move the cutting blade on the cutting blade holder in the second direction, the cutting blade holders holding the cutting blades such that a centerline of curvature of a downstream cutting blade, in the direction of product movement, is closer to the product supporting member than that of an upstream cutting blade, so as to incrementally reprove product in shaping the exposed top surface of the product.

8. Apparatus according to claim 1, wherein the conveying member is a rotary indexing dial, the at least one cutting blade being moved by the structure for providing relative movement, in a direction perpendicular to a tangent to the rotary indexing dial at a respective cutting station.

9. Apparatus according to claim 2, further comprising a rotary trailing corner cut-off blade, upstream, in the first direction, of the at least one cutting station.

10. Apparatus according to claim 2, wherein the structure for providing relative movement between the cutting blade and the product, in the second direction, is a curved track on which the product supporting member travels.

11. Apparatus according to claim 2, wherein the at least one cutting blade only moves toward the product support member, and away therefrom, in the second direction.

12. Apparatus according to claim 1, further comprising reclaiming structure for reclaiming product cut off in shaping the exposed surface.

13. Apparatus according to claim 1, wherein said structure for providing relative movement does not move the at least one cutting blade in the first direction as the product is being conveyed through the cutting station.

14. Apparatus according to claim 1, wherein said structure for providing relative movement moves the at least one cutting blade substantially only perpendicular to the first direction as the product is being conveyed through the cutting station.

15. Apparatus according to claim 1, wherein said structure for providing relative movement moves the at least one cutting blade, and wherein the apparatus further includes timing structure to time motion of the at least one cutting blade to the movement of the product as the product is being conveyed through the cutting station.

16. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station, the driving member including a conveying member for moving the product through the at least one cutting station while the product is being shaped by the at least one cutting blade at the at least one cutting station, whereby the product having the exposed surface is moving in the first direction while the cutting blade cuts the exposed surface the conveying member being a continuous belt conveyor, having a plurality of product supporting members thereon, each product supporting member for holding an individual product; and structure for providing relative movement between the at least one cutting blade and the product in a second direction, different from the first direction, such that the relative movement is provided between the product and the at least one cutting blade in the second direction as the product is being conveyed through the cutting station, so as to cut the exposed surface of the product to have a desired profile in the first direction while the product is moving through the cutting station in the first direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

17. Apparatus for shaping an exposed surface of a cosmetic stick product, comprising:

a plurality of cutting stations where said exposed surface is shaped, each of the cutting stations including at least one cutting blade;

a product supporting member for supporting the product as the product moves relative to the plurality of cutting stations through the plurality of cutting stations in a first direction;

a driving member for providing relative movement, in the first direction, between said plurality of cutting stations and the product when the product is being shaped by the at least one cutting blade at the plurality of cutting stations; and structure for providing relative movement between the at least one cutting blade and the product in a second direction, different from the first direction, such that the at least one cutting blade moves in the second direction as the product is being conveyed through the cutting station, so as to cut the exposed surface of the product to have a desired profile the first direction, wherein the structure for providing relative movement between the at least one cutting blade and the product includes, for each cutting blade, a cutting blade holder and driving means to reciprocatingly move the cutting blade on the cutting blade holder in the second direction, the cutting blade holders holding the cutting blades such that a centerline of curvature of a downstream cutting blade, in the direction of product movement, is closer to the product supporting member than that of an upstream cutting blade, so as to incrementally remove product in shaping the exposed top surface of the product; and wherein the at least one cutting blade has a predetermined profile in a third direction different from the first and second directions so as to give the exposed surface of the product a desired profile in the third direction.

18. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product while the product is being shaped by the at least one cutting blade at the at least one cutting station, wherein the driving member includes a conveying member for conveying the product through the at least one cutting station, the conveying member being a rotary indexing dial; and structure for providing relative movement between the at least one cutting blade and the product in a second direction, different from the first direction, such that the at least one cutting blade moves in the second direction as the product is being conveyed through the cutting station, so as to cut the exposed surface of the product to have a desired profile in the first direction while the product is conveyed through the cutting station in the first direction, the at least one cutting blade being moved by said structure for providing relative movement, in a direction perpendicular to a tangent to the rotary indexing dial, at a respective cutting station; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

19. Apparatus according to claim 8, further comprising at least one stationary cutting blade upstream of the at least one cutting blade, in the first direction.

20. Apparatus according to claim 19, including a plurality of stationary cutting blades, a downstream stationary cutting blade being closer to the rotary indexing dial than an upstream stationary cutting blade.

21. Apparatus according to claim 19, further comprising a rotary trailing corner cut-off blade, upstream, in the first direction, of the at least one stationary cutting blade.

22. Apparatus according to claim 8, further comprising a rotary trailing corner cut-off blade, upstream, in the first direction, of the at least one cutting station.

23. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station;

structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is moving through the cutting station in the first direction; and a rotary trailing corner cut-off blade, upstream, in the first direction, of the at least one cutting station; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

24. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product while the product is being shaped by the at least one cutting blade at the at least one cutting station; and structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is moving through the cutting station in the first direction, said structure including a curved track on which the product supporting member travels; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

25. Apparatus according to claim 24, wherein the at least one cutting blade is stationary.

26. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station; and structure for providing relative movement between the at least one cutting blade and the product in a second direction, different from the first direction, such that the at least one cutting blade moves in the second direction as the product is being conveyed through the cutting station, so as to cut the exposed surface of the product to have a desired profile in the first direction while the product is moving through the at least one cutting station in the first direction, wherein the at least one cutting blade only moves toward the product support member, and away therefrom, in the second direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

27. Apparatus for shaping an exposed surface of a cosmetic stick product, comprising:

at least one cutting station where said exposed surface is shaped, each of the at least one cutting stations including at least one cutting blade, the at least one cutting blade being heated;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station; and structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is being conveyed through the cutting station in the first direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

28. Apparatus for shaping an exposed surface of a cosmetic stick product, comprising:

at least one cutting station where said exposed surface is shaped, each of the at least one cutting stations including at least one cutting blade, each of the cutting blades having a plurality of cutting surfaces;

indexing means for moving the at least one cutting blade to present different cutting surfaces of the respective cutting blade to different exposed surfaces to be shaped;

a product supporting member for supporting the product as the product moves relative to the at least one cutting station through the at least one cutting station in a first direction;

a driving member for providing relative movement, in the first direction, between said at least one cutting station and the product when the product is being shaped by the at least one cutting blade at the at least one cutting station; and structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is moving through the cutting station in the first direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

29. Apparatus according to claim 28, wherein the apparatus further comprises a cleaning member for cleaning cutting surfaces, of the plurality of cutting surfaces, that have previously been used to shape exposed surfaces of product.

30. Apparatus according to claim 29, wherein the cleaning member includes a squeegee positioned to contact cutting surfaces as the cutting blade is moved to present a different cutting surface to exposed surfaces to be shaped.

31. Apparatus for shaping an exposed surface of a cosmetic stick product, comprising:

at least one cutting station where said exposed surface is shaped, each of the at least one cutting stations including at least one cutting blade;

a product supporting member for supporting the product as the product moves relative to the at least one cutting station through the at least one cutting station in a first direction, the product supporting member being a member to support an antiperspirant or deodorant stick product, whereby the top exposed surface of the antiperspirant or deodorant stick product is shaped;

a driving member for providing relative movement, in the first direction, between said at least one cutting station and the product when the product is being shaped by the least one cutting blade at the at least one cutting station; and structure for providing relative movement between the at least one cutting blade and the product in a second direction, different from the first direction, such that the relative movement is provided between the product and the at least one cutting blade in the second direction while the product is being conveyed through the cutting station, so as to cut the exposed surface of the product to have a desired profile in the first direction while the product is moving through the at least one cutting station in the first direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

32. Apparatus according to claim 31, wherein the antiperspirant or deodorant stick product is an elongated antiperspirant or deodorant stick product, the product supporting member being positioned so as to support the elongated stick product such that the elongated dimension extends in the first direction.

33. Apparatus for shaping an exposed surface of a cosmetic stick product, comprising:

a plurality of cutting stations where said exposed surface is shaped, each of the cutting stations including at least one cutting blade, the cutting blades being positioned such that the cutting blades incrementally cut product material from the exposed surface of the product;

a product supporting member for supporting the product as the product moves relative to the plurality of cutting stations through the plurality of cutting stations in a first direction;

a driving member for providing relative movement, in the first direction, between said plurality of cutting stations and the product when the product is being shaped by the at least one cutting blade at the plurality of cutting stations; and structure for providing relative movement between the at least one cutting blade and the product in a second direction, different from the first direction, such that the relative movement is provided between the product and the at least one cutting blade in the second direction while the product is being conveyed through the cutting station in the first direction, so as to cut the exposed surface of the product to have a desired profile in the first direction while the product is moving through the cutting station in the first direction; and wherein the at least one cutting blade has a predetermined profile in a third direction different from the first and second directions so as to give the exposed surface of the product a desired profile in the third direction, so that during the cutting at the at least one cutting station the exposed surface of the product is cut to simultaneously provide desired profiles in the first and third directions.

34. Apparatus according to claim 33, wherein the structure for providing relative movement between the at least one cutting blade and the product includes, for each cutting blade, a cutting blade holder and driving means to reciprocatingly move the cutting blade on the cutting blade holder in the second direction, the cutting blade holders holding the cutting blades such that a centerline of curvature of a downstream cutting blade, in the direction of product movement, is closer to the product supporting member than that of an upstream cutting blade, so as to incrementally remove product in shaping the exposed top surface of the product.

35. Apparatus according to claim 34, wherein the driving means reciprocatingly moves the cutting blades such that each cutting blade moves reciprocatingly with the same amplitude.

36. A method of shaping an exposed surface of a cosmetic stick product, comprising the steps of:

passing the product, having the exposed surface, through at least one cutting station, the at least one cutting station each having at least one cutting blade, the product moving, in a first direction in passing through the at least one cutting stations;

while said product is moving in said first direction in passing through the at least one cutting station, moving the at least one cutting blade in a second direction, different from the first direction, so as to cut the exposed surface to have a predetermined curvature in the first direction; and wherein said at least one cutting blade has a predetermined curvature in a third direction different from the first and second directions, such that in moving the cutting blade in the second direction the exposed surface is cut so as to have a curvature in the third direction, whereby the exposed surface is provided simultaneously with the curvature in the first direction and the curvature in the third direction.

37. A method according to claim 36, wherein said second direction is perpendicular to said first direction, and said third direction is perpendicular to the first and second directions.

38. A method according to claim 37, wherein the at least one cutting blade moves reciprocatingly, in the second direction, so as to cut the exposed surface to have the predetermined curvature in the first direction.

39. A method according to claim 36, wherein the product is passed through a plurality of the cutting stations, and wherein at each cutting station an incremental amount of product is cut in shaping the exposed surface.

40. A method according to claim 36, wherein the product is passed through a single cutting station a plurality of times, and wherein in each pass through the single cutting station an incremental amount of product is cut off the exposed surface of the product so as to shape the exposed surface.

41. A method according to claim 36, wherein the product has a leading end which first contacts a cutting blade and a trailing end which last contacts the cutting blade, and wherein the method includes the further step of cutting off the trailing end prior to passing the trailing end through the at least one cutting station.

42. A method of shaping an exposed surface of a cosmetic stick product, comprising the steps of:

passing the product, having the exposed surface, through a plurality of cutting stations, the cutting stations each having at least one cutting blade, the product moving, relative to the cutting stations, in a first direction in passing through the cutting stations;

while said product is moving in passing through the cutting stations, providing relative movement between the product and the at least one cutting blade in a second direction, different from the first direction, so as to cut the exposed surface to have a predetermined curvature in the first direction, an incremental amount of product being cut in shaping the exposed surface; and wherein said at least one cutting blade has a predetermined curvature in a third direction different from the first and second directions, such that in moving the cutting blade in the second direction the exposed surface is cut so as to have a curvature in the third direction, whereby the exposed surface is provided simultaneously with the curvature in the first direction and the curvature in the third direction.

43. A method of shaping an exposed surface of a deodorant or antiperspirant stick product, comprising the steps of:

passing the deodorant or antiperspirant stick product, having the exposed surface, through at least one cutting station, the at least one cutting station each having at least one cutting blade, the product moving, relative to the at least one cutting station, in a first direction passing through the at least one cutting station;

while said product is moving in passing through the at least one cutting station, providing relative movement between the product and the at least one cutting blade in a second direction, different from the first direction, so as to cut the exposed surface to have a predetermined curvature in the first direction; and wherein said at least one cutting blade has a predetermined curvature in a third direction different from the first and second directions, such that in moving the cutting blade in the second direction the exposed surface is cut so as to have a curvature in the third direction, whereby the exposed surface is provided simultaneously with the curvature in the first direction and the curvature in the third direction.

44. A method of shaping an exposed surface of a cosmetic stick product, the product having a leading end which first contacts a cutting blade and a trailing end, comprising the steps of:

passing the product, having the exposed surface, through at least one cutting station, the at least one cutting station each having at least one cutting blade, the product moving, relative to the at least one cutting station, in a first direction in passing through the at least one cutting station;

cutting off the trailing end prior to passing the trailing end through the at least one cutting station;

while said product is moving in passing through the at least one cutting station, providing relative movement between the product and the at least one cutting blade in a second direction, different from the first direction, so as to cut the exposed surface to have a predetermined curvature in the first direction; and wherein said at least one cutting blade has a predetermined curvature in a third direction different from the first and second directions, such that in moving the cutting blade in the second direction the exposed surface is cut so as to have a curvature in the third direction, whereby the exposed surface is provided simultaneously with the curvature in the first direction and the curvature in the third direction.

45. A method of shaping an exposed surface of a deodorant or antiperspirant stick product, comprising the steps of:

passing the deodorant or antiperspirant stick product, having the exposed surface, through at least one cutting station, the at least one cutting station each having at least one cutting blade, the deodorant or antiperspirant stick product moving, relative to the at least one cutting station, in a first direction in passing through the at least one cutting station;

while said deodorant or antiperspirant stick product is moving in passing through the at least one cutting station, providing relative movement between the deodorant or antiperspirant stick product and the at least one cutting blade in a second direction, different from the first direction, so as to cut the exposed surface to have a predetermined curvature in the first direction; and wherein said at least one cutting blade has a predetermined curvature in a third direction different from the first and second directions, such that in moving the cutting blade in the second direction the exposed surface is cut so as to have a curvature in the third direction, whereby the exposed surface is provided simultaneously with the curvature in the first direction and the curvature in the third direction.

46. A method according to claim 45, wherein the deodorant or antiperspirant stick product is an elongated deodorant or antiperspirant stick product, the elongated stick product having a relatively long length and relatively narrow width, and wherein the length extends in said first direction.

* * * * *